United States Patent Office 3,027,374
Patented Mar. 27, 1962

3,027,374
NEW VAT DYES
Isaiah Von, Somerville, and Andrew Stephen Tomcufcik and William Baptist Hardy, Bound Brook, N.J., assignors to American Cyanamid Company, New York, N.Y., a corporation of Maine
No Drawing. Filed June 8, 1953, Ser. No. 360,326
6 Claims. (Cl. 260—274)

This invention relates to new vat dyestuffs having the formula:

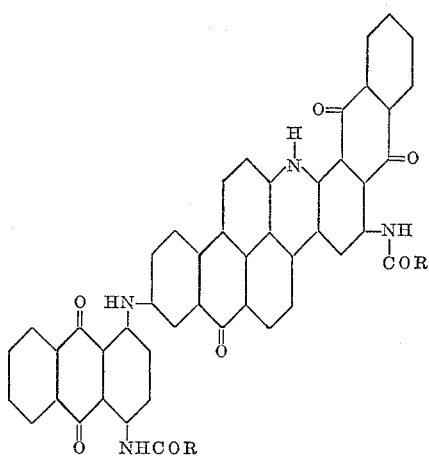

in which COR represents a benzoyl group.

Dyestuffs for the dyeing of military uniforms present a serious problem. The enormous increase in fire power in modern warfare makes it imperative for soldiers to blend into the terrain so that they are either unobserved or present relatively poor targets. The art of camouflage resulted in the development of uniforms having colors which blend into the average landscape. During the Second World War, observation by means of infrared radiation completely changed the problem of camouflage because, while dyes of excellent fastness and dull drab shades under visible light were generally used for the dyeing of uniforms, all of the fast dyes with otherwise desirable properties showed high reflectance in the infrared and therefore soldiers wearing uniforms dyed with these dyes, when observed under infrared radiation, for example by means of devices such as snooperscopes and sniperscopes, stood out against average terrain making discovery easy and presenting excellent targets. Extensive investigations have shown that, to be effective under infrared observation, dyed fabrics must show an infrared reflectance which is relatively low, preferably below 25%, but which of course should not be too low. In other words in average terrain, a soldier to be effectively concealed or to present a poor target should appear no lighter than the background and while it is undesirable that a soldier should appear much darker, any difference in the infrared reflectance from that of the terrain should be on the darker rather than on the lighter side.

There are known some dyes, for example some sulfur dyes, which exhibit low infrared reflectance. These dyes, however, have such inferior fastness to light and to the rather drastic washing conditions in the field that they are not practical. On the other hand, vat dyes which show satisfactory light and wash fastness have, in the past, also shown high infrared reflectance. The need for vat dyes of low infrared reflectance and satisfactory fastness properties has therefore been unfulfilled, both for use as the only dyes for uniforms and for use in blends with small amounts of other dyes of higher infrared reflectance.

The dyestuffs of the present invention have a desirably low infrared reflectance and they also have satisfactory fastness properties for military use. Their visual shades are olive browns which are useful as such for certain purposes and are satisfactory for blending with other vat dyestuffs of suitably low infrared reflectance to produce any desired olive drab shade.

The dyestuff prepared most readily is from the corresponding diamino derivative, which is acylated by acid halides or anhydrides of the benzoic acids desired. Typical acylation agents in addition to benzoyl chloride are the acid chlorides or anhydrides of o-chlorobenzoic acid, 2,4-dichlorobenzoic acid, o-bromobenzoic acid, o-methoxybenzoic acid, 2,4-dimethoxybenzoic acid, 2-methoxy-4-methylbenzoic acid, 2-ethoxybenzoic acid, o-toluic acid, m-methylsulfonylbenzoic acid, p-phenylsulfonylbenzoic acid, and the like. The acylation proceeds readily using standard acylation techniques. Where the acid halides are used, hydrogen halide is set free and the reaction is preferably effected in the presence of an acid-binding agent, such as pyridine or other heterocyclic bases, soda ash and the like.

In addition to the vat dyestuffs themselves, the unacylated intermediate, which contains two free amino groups, is itself a new compound.

The invention will be described in greater detail in conjunction with the specific examples, the parts being by weight unless otherwise specified.

*Example 1*

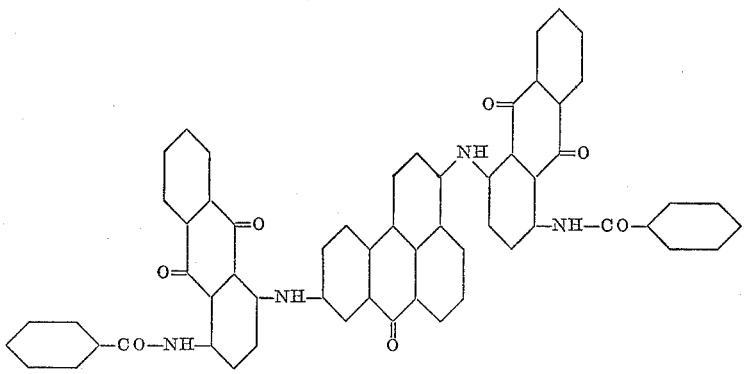

A mixture of 77.6 parts of Bz-1,6-dibromobenzanthrone, 150 parts of 1-amino-4-benzaminoanthraquinone, 50 parts of anhydrous potassium carbonate, 5 parts of copper oxide, 5 parts of cupric acetate, 1,800 parts of nitrobenzene is stirred at reflux until the reaction is substantially complete. The mixture is then cooled to room temperature and the product isolated by filtration. The cake is first washed with alcohol and then slurried in hot dilute hydrochloric acid. The product is isolated by filtration and washing and is then dried. The yield is good.

Example 2

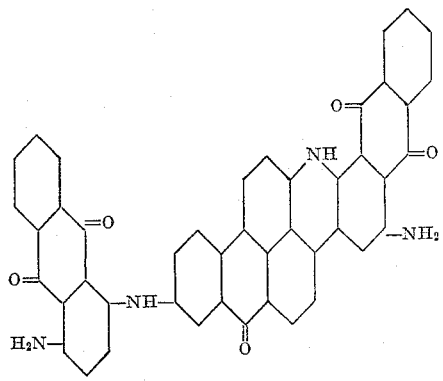

80 parts of the product of Example 1 are added to a mixture of 1,000 parts of potassium hydroxide and 850 parts of methanol held at 150° C. The mixture is stirred at 145–150° C. until the reaction is substantially complete. It is then drowned in 20,000 parts of water and aerated until the product has completely precipitated. The product is isolated by filtration, washed neutral, and dried. The yield is good.

Example 3

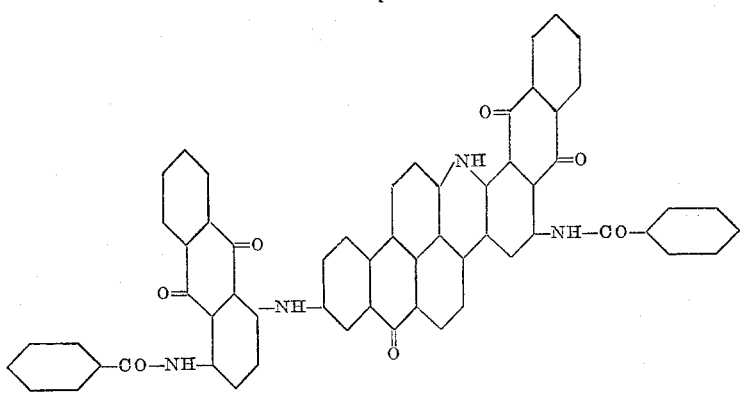

A mixture of 40 parts of the product of Example 2, 36 parts of benzoyl chloride, 10 parts of pyridine, and 100 parts of nitro-benzene is stirred at 150° C. until the reaction is substantially complete. The reaction mixture is cooled at 100° C. and diluted with 1,000 parts of anhydrous alcohol. The diluted mass is then allowed to cool to room temperature and the product is isolated by filtration, washed with hot alcohol and dried. The yield of dye is excellent. It dyes cellulose fibers an olive brown shade of good light fastness and infrared reflectance properties.

Example 4

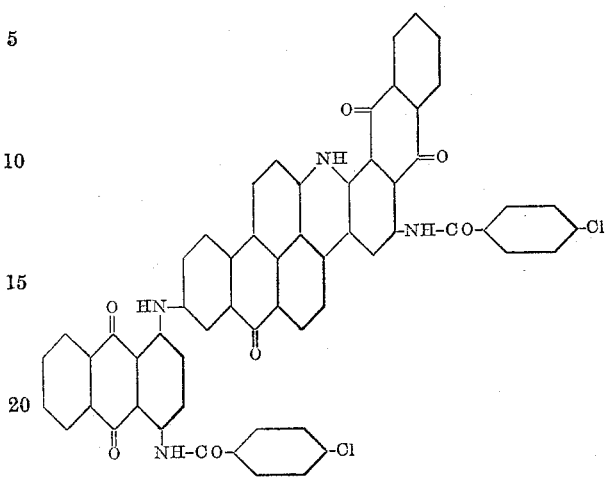

The procedure of Example 3 is followed replacing benzoyl chloride with an equivalent amount of p-benzoyl chloride. An excellent yield of dye is obtained which dyes cellulose fibers a similar shade to that obtained with the product of Example 3 having good light fastness and low infrared reflectance.

Example 5

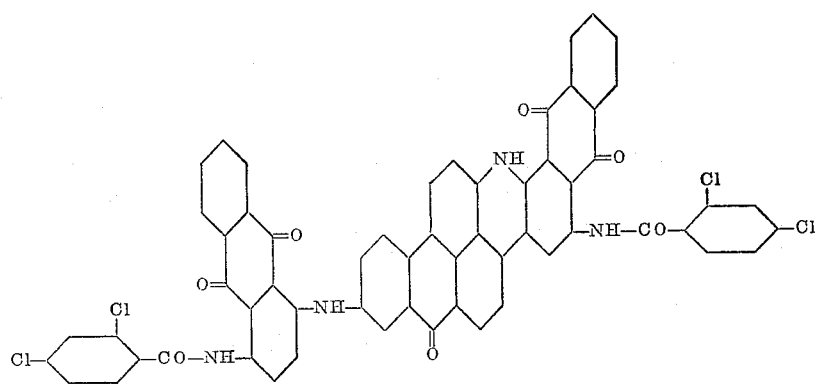

The procedure of Example 3 is followed replacing benzoyl chloride with an equivalent amount of 2,4-dichlorobenzoic acid anhydride. An excellent yield of dye is obtained which dyes cellulose fibers a shade similar to that obtained with the product of Example 3 and having good light fastness and low infrared reflectance.

Example 6

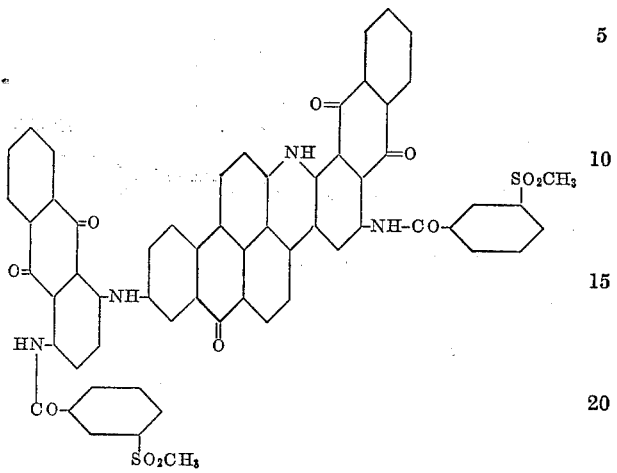

The procedure of Example 3 is followed using an equivalent amount of m-methylsulfonylbenzoic acid instead of benzoyl chloride. An excellent yield of dye is obtained, which dyes cellulose fibers a shade similar to that obtained with the product of Example 3. They have good light fastness and low infrared reflectance.

Example 7

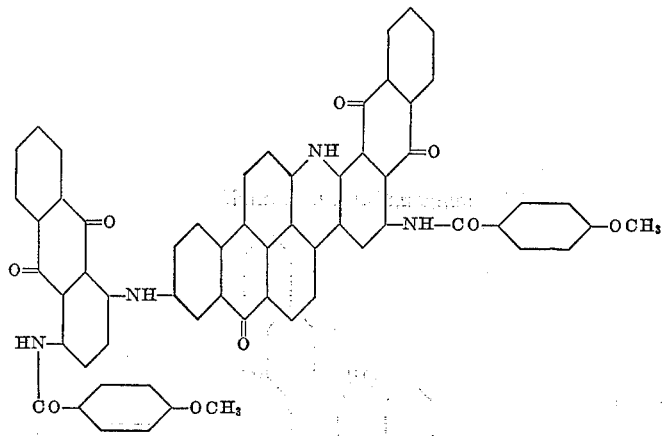

The procedure of Example 3 is followed replacing benzoyl chloride with an equivalent amount of p-methoxybenzoyl chloride. An excellent yield of dye is obtained which dyes cellulosic fibers a shade similar to that obtained with the product of Example 3, having good light fastness and low infrared reflectance.

We claim:
1. Compounds of the formula:

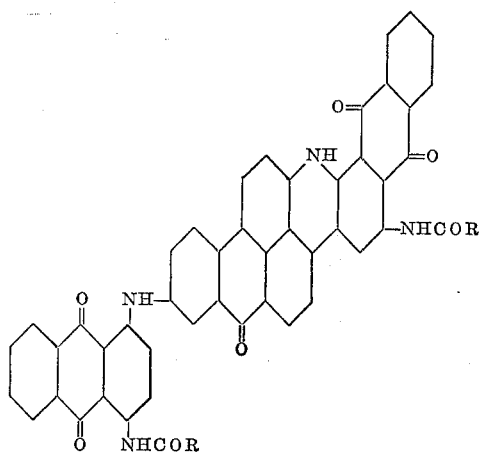

in which R—CO is a benzoyl group.

2. The compound of the formula:

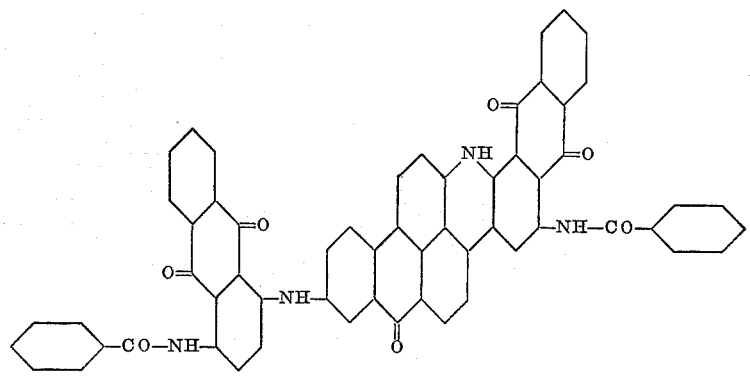

3. The compound of the formula:
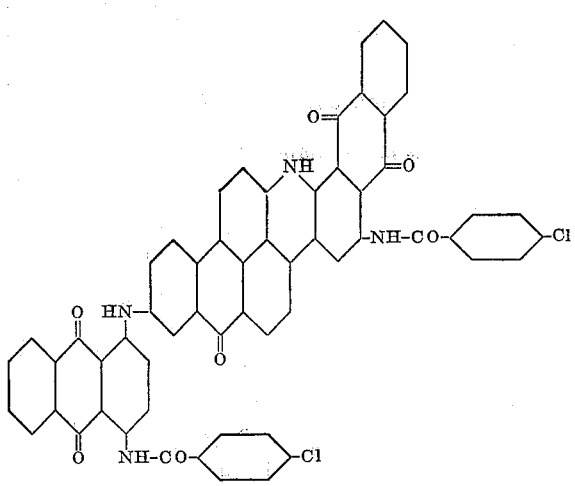
5. The compound of the formula:
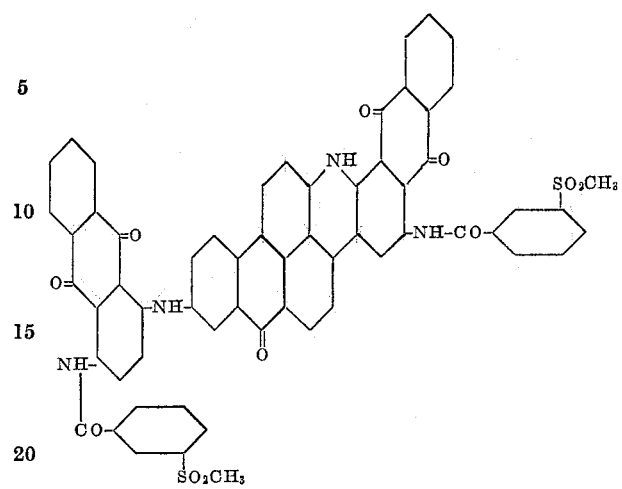
4. The compound of the formula:
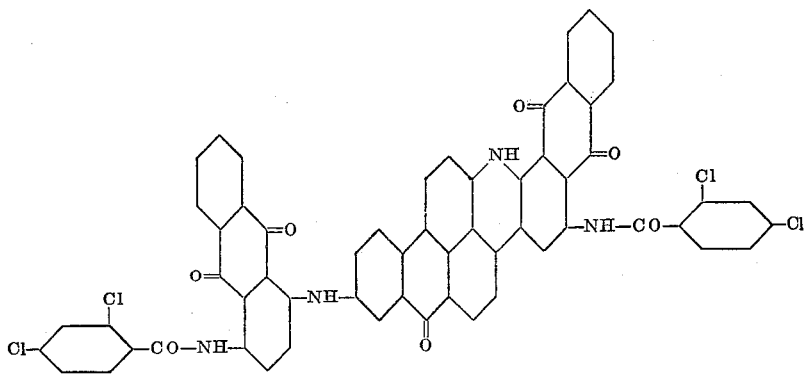
6. The compound of the formula:
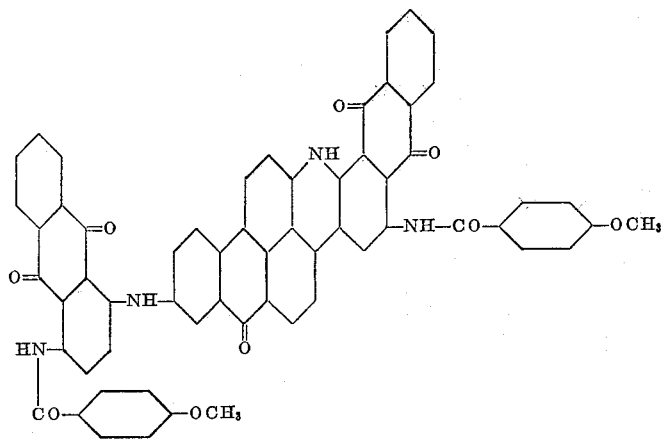
References Cited in the file of this patent
UNITED STATES PATENTS
2,392,794    Zerweck et al. _____ Jan. 8, 1946
2,530,010    Fiorini _____ Nov. 14, 1950